(12) United States Patent
Chen

(10) Patent No.: US 9,047,792 B2
(45) Date of Patent: Jun. 2, 2015

(54) BACKLIGHT MODULE WITH DIFFUSION SHEET HAVING A SUB-WAVELENGTH GRATING

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 13/893,352

(22) Filed: May 14, 2013

(65) Prior Publication Data

US 2014/0168948 A1  Jun. 19, 2014

(30) Foreign Application Priority Data

Dec. 17, 2012 (TW) .............................. 101147755 A

(51) Int. Cl.
*G09F 13/04* (2006.01)
*G02B 5/02* (2006.01)
*G02B 5/18* (2006.01)

(52) U.S. Cl.
CPC .............. *G09F 13/04* (2013.01); *G02B 5/0242* (2013.01); *G02B 5/0252* (2013.01); *G02B 5/1809* (2013.01)

(58) Field of Classification Search
CPC ................................ G02B 5/0247; G02B 5/18
USPC ................. 362/97.1, 97.3, 558; 359/599, 707
See application file for complete search history.

(56) References Cited

U.S. PATENT DOCUMENTS

| | | | | |
|---|---|---|---|---|
| 6,846,098 | B2 * | 1/2005 | Bourdelais et al. | 362/330 |
| 7,237,940 | B2 * | 7/2007 | Yu et al. | 362/621 |
| 2005/0195487 | A1 * | 9/2005 | Yu et al. | 359/599 |
| 2006/0285359 | A1 * | 12/2006 | Yang et al. | 362/615 |

* cited by examiner

*Primary Examiner* — Ali Alavi
(74) *Attorney, Agent, or Firm* — Novak Druce Connolly Bove + Quigg LLP

(57) ABSTRACT

A diffusion sheet includes a light incident surface and a light emitting surface opposite to the light incident surface. The light emitting surface includes a sub-wavelength grating to diffuse lights propagated in the diffusion sheet. The sub-wavelength grating is used to avoid a total internal reflection of some of the lights. A backlight module having the diffusion sheet is also provided.

10 Claims, 2 Drawing Sheets

BACKLIGHT MODULE WITH DIFFUSION SHEET HAVING A SUB-WAVELENGTH GRATING

BACKGROUND

1. Technical Field

The present disclosure relates to diffusion sheets having a sub-wavelength gating and particularly to a backlight module for liquid crystal display devices employing such a diffusion sheet.

2. Description of Related Art

Direct type backlight modules in an LCD display device usually include light sources placed under the LCD panel and a diffuser located between the LCD panel and the light sources. The light emitted by the light sources propagates through the diffusion sheet and is diffused by the diffusion sheet, and then passes through a light emitting surface of the diffusion sheet. However, some of the lights may be entirely reflected and cannot pass through the light emitting surface because of a total internal reflection, so that light utilization efficiency is deceased.

Therefore, it is desirable to provide a new kind of backlight module to resolve the above shortcomings

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding portions throughout the several views.

DETAILED DESCRIPTION

Embodiments of the present disclosure will be described with reference to the accompanying drawings.

Figure 1:
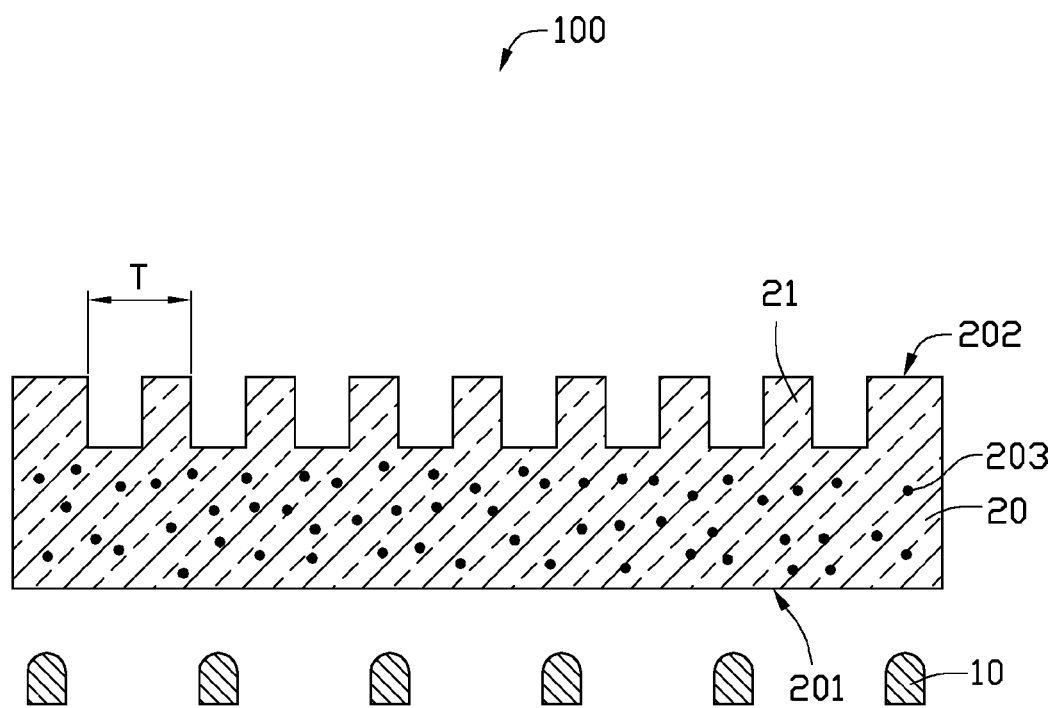
FIG. 1 is a side view of a backlight module in accordance with an exemplary embodiment.

FIG. 1 shows an embodiment of the present disclosure of a backlight module 100. The backlight module 100 includes a number of aligned point light sources 10 and a diffusion sheet 20. In this embodiment, the light sources 22 are normal, linear cold cathode fluorescent tubes (CCFLs).

The diffusion sheet 20 is made of a transparent organic resin material, such as, polymethyl methacrylate (PPMA), polycarbonate (PC) or the like. The diffusion sheet 20 includes a light incident surface 201 facing the light sources 10 and a light emitting surface 202. The diffusion sheet 20 further includes a number of light scattering particles 203 therein to scatter the light emitted by the light sources 10.

Figure 2:
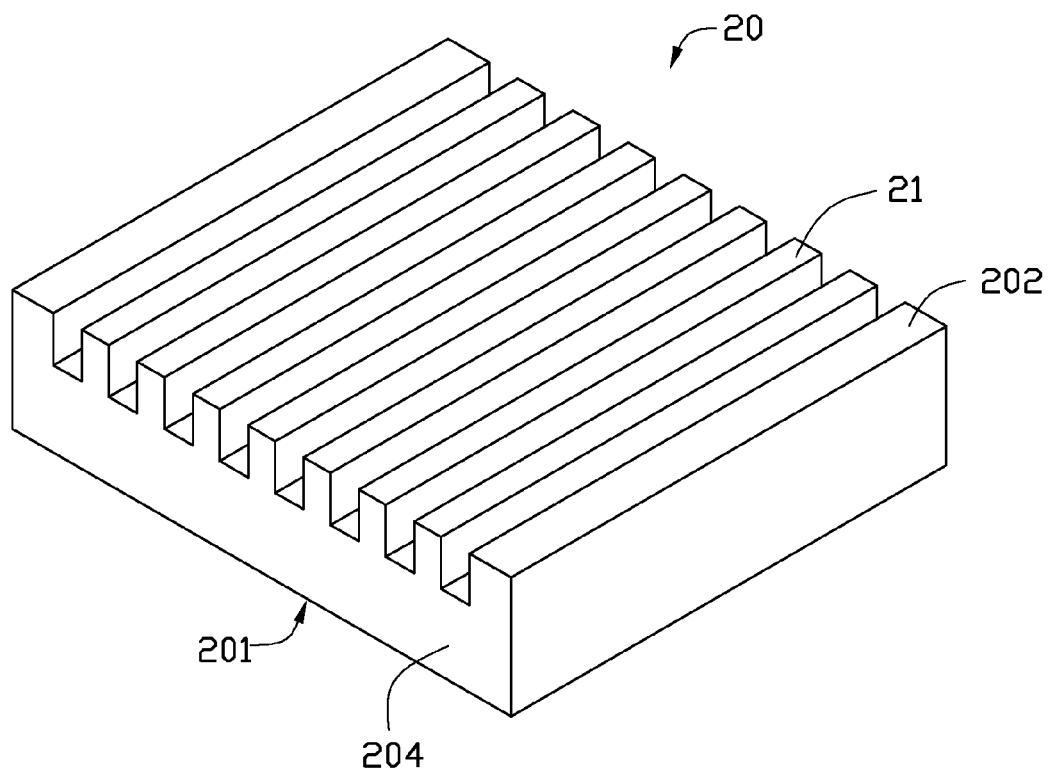
FIG. 2 is an isometric view of a diffusion sheet of the backlight module of FIG. 1.

FIG. 2 shows an isometric view of an embodiment of a diffusion sheet 20. The light emitting surface 202 defines a sub-wavelength grating 21. In this embodiment, the sub-wavelength grating 21 and a body 204 of the sheet 20 are integrally formed. The sub-wavelength grating 21 defines a number of parallel channels, and each of the channels has a rectangular cross-section. In an alternative embodiment, the sub-wavelength grating 21 may define a number of parallel v-shaped grooves. In this embodiment, a grating period T of the sub-wavelength grating 21 is less than a wavelength of the light and is greater than one third of the wavelength of the light.

In operation, the lights emitted sources 10 emit lights. When the lights propagate through the diffusion sheet 20, some of the lights with incident angle larger than a critical angle of total internal reflection can pass through the light emitting surface 202 because the sub-wavelength grating 21 causes these lights to diffract in a negative first-order. Thus, almost all the incident lights can pass through the light emitting surface 202. Thereby, the efficiency of light utilization is enhanced.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A diffusion sheet comprising:
   a light incident surface forming no sub-wavelength grating; and
   a light emitting surface opposite to the light incident surface, the light emitting surface comprising a sub-wavelength grating formed thereat, the sub-wavelength grating being configured to avoid or reduce total internal reflection of light at the light emitting surface.

2. The diffusion sheet as claimed in claim 1, wherein the diffusion sheet is made of polymethyl methacrylate.

3. The diffusion sheet as claimed in claim 1, wherein the diffusion sheet is made of polycarbonate.

4. The diffusion sheet as claimed in claim 1, wherein the sub-wavelength grating defines a plurality of parallel channels, and each of the channels has a rectangular cross-section.

5. The diffusion sheet as claimed in claim 1, wherein a grating period of the sub-wavelength grating is less than a wavelength of the light and is greater than one third of the wavelength of the light.

6. A backlight module comprising
   a plurality of aligned point light sources; and
   a diffusion sheet adjacent to the light source, the diffusion sheet comprising a light incident surface for receiving light from the point light sources and a light emitting surface opposite to the light incident surface, the light incident surface forming no sub-wavelength grating, the light emitting surface comprising a sub-wavelength grating formed thereat, the sub-wavelength grating being configured to avoid or reduce total internal reflection of the light.

7. The backlight module as claimed in claim 6, wherein a grating period of the sub-wavelength grating is less than a wavelength of the light emitted by the point light sources and is greater than one third of the wavelength of the light emitted by the point light sources.

8. The backlight module as claimed in claim 6, wherein the diffusion sheet is made of polymethyl methacrylate.

9. The backlight module as claimed in claim 6, wherein the diffusion sheet is made of polycarbonate.

10. The backlight module as claimed in claim 6, wherein the sub-wavelength grating defines a plurality of parallel channels, and each of the channels has a rectangular cross-section.

* * * * *